United States Patent [19]

Pitts

[11] 4,382,632
[45] May 10, 1983

[54] DUMPING VEHICLE STABILIZER SYSTEM

[76] Inventor: Charlie C. Pitts, 732 Blue Fathom Dr., Bridgeport, Tex. 76026

[21] Appl. No.: 386,972

[22] Filed: Jun. 10, 1982

[51] Int. Cl.$^3$ ............................................. B60P 1/16
[52] U.S. Cl. ................................. 298/17 S; 298/22 P
[58] Field of Search ................ 105/27; 298/1 R, 17.5, 298/17 B, 17 R, 17 S, 17 SG, 20 R, 20 A, 22 R, 22 P, 22 AE; 212/189

[56] References Cited

U.S. PATENT DOCUMENTS

| | | | |
|---|---|---|---|
| 3,421,793 | 1/1969 | Pioch | 298/17 S |
| 3,459,451 | 8/1969 | Hoy | 298/22 AE |
| 3,640,578 | 2/1972 | Finney | 298/17 S |
| 4,145,682 | 3/1979 | Cook | 298/1 R X |
| 4,216,996 | 8/1980 | Pitts | 298/17 S |

Primary Examiner—Robert J. Spar
Assistant Examiner—Ken Muncy
Attorney, Agent, or Firm—Stephen D. Carver

[57] ABSTRACT

A stabilizer system for automatically leveling the dump body of a rear dumping vehicle. The system is adapted to be employed with a tractor-trailer rig including an elongated pivot dumping body associated with a trailer. First and second hydraulic rams coupled to the front of the dump body are employed to tilt and simultaneously level the trailer dump body during unloading. The lower ends of the hydraulic rams terminate in pressure plate apparatus adapted to contact the driven, rear wheeled axles of the tractor unit. The pressure plates include a plurality of rollers rotatably secured to the pressure plate which support the weight transmitted by the rams while permitting rotation of the tractor tires. An electrical-hydraulic system controlled by a pivoted pendulum appropriately actuates the rams for leveling the apparatus. Thus the entire unit may be manuevered by the tractor while unloading and tilting the dump body, simultaneously with the automatic leveling function. The pressure plate assembly is removably pivoted to the truck tractor frame to permit quick removal for deployment in a road position.

6 Claims, 7 Drawing Figures

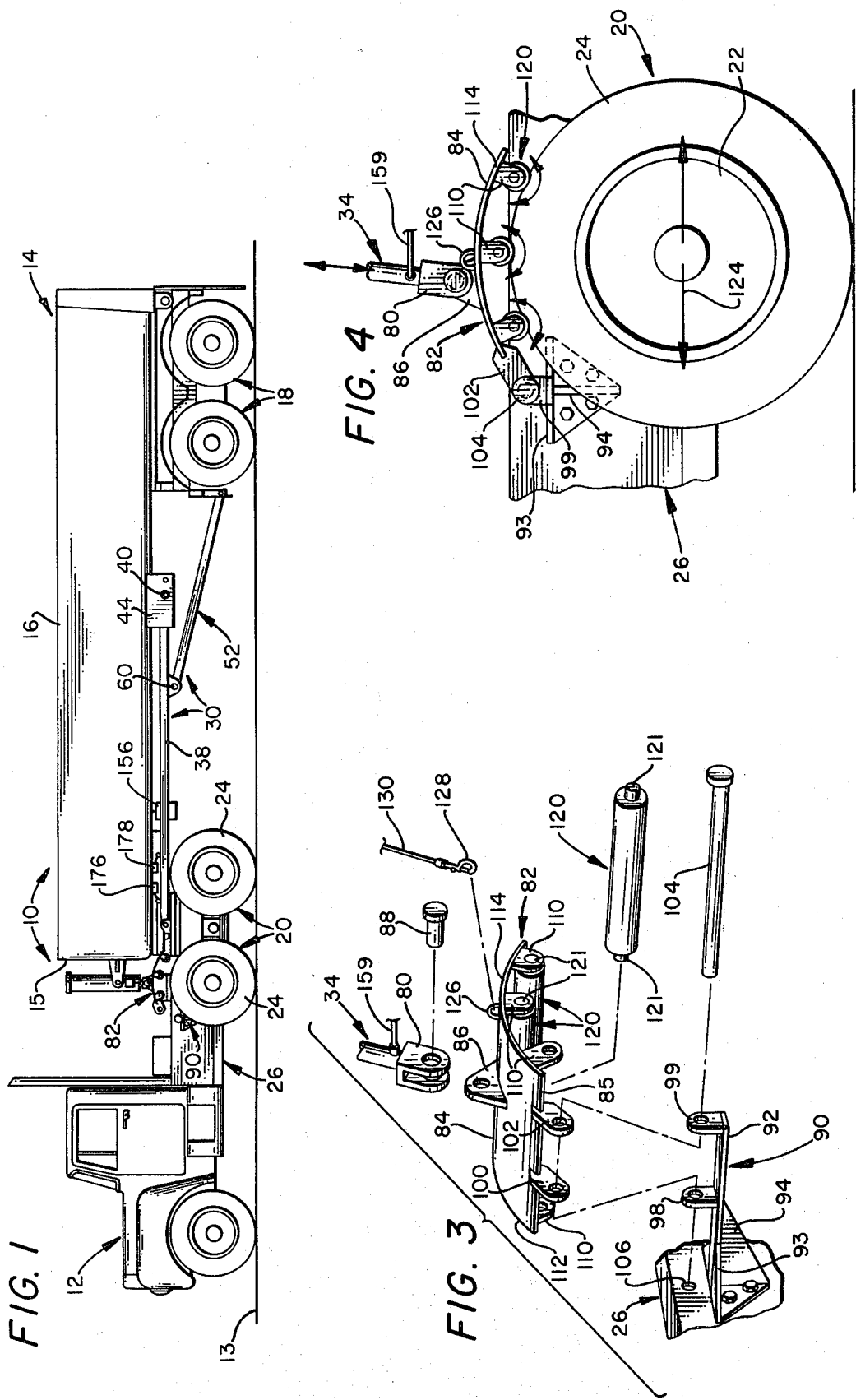

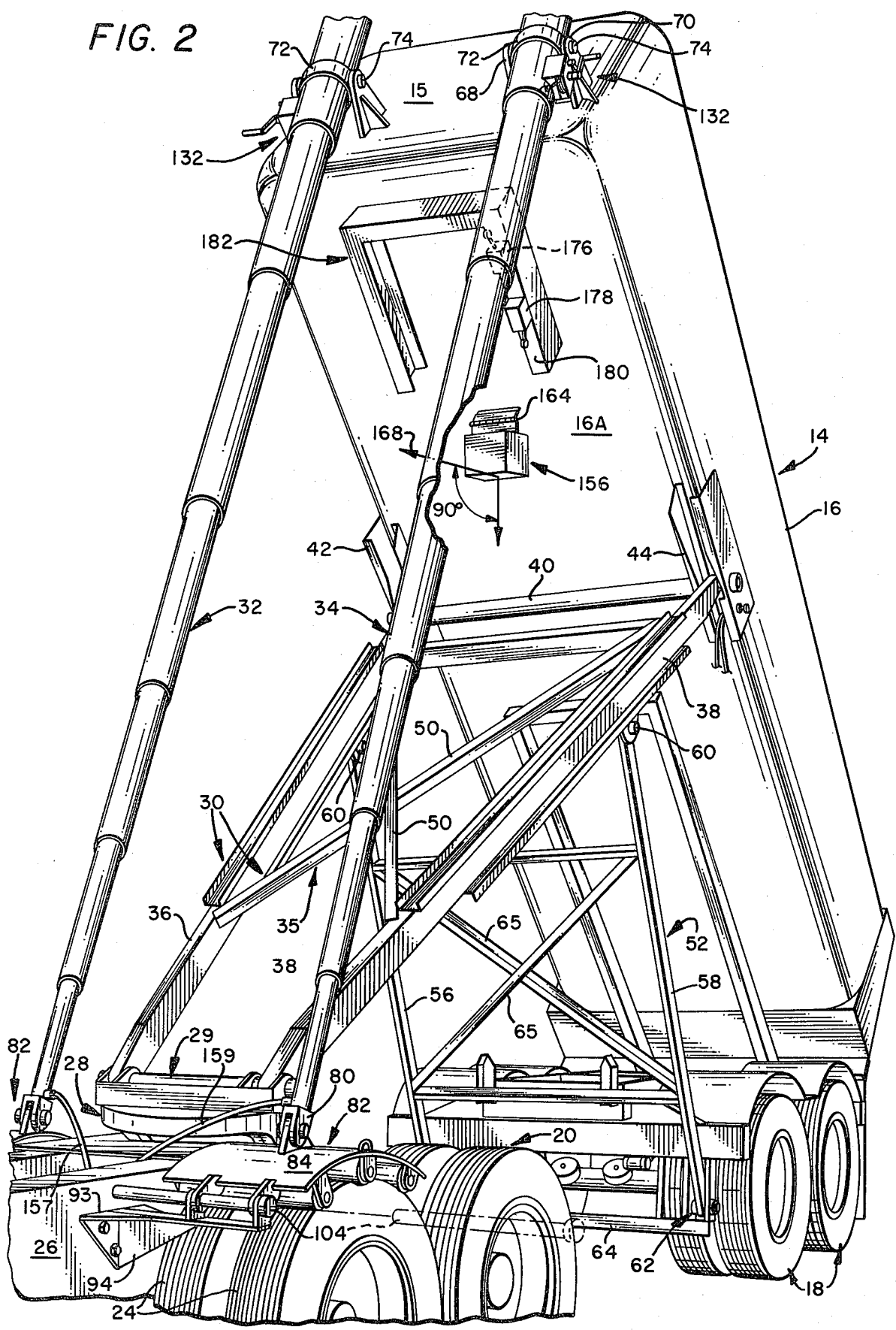

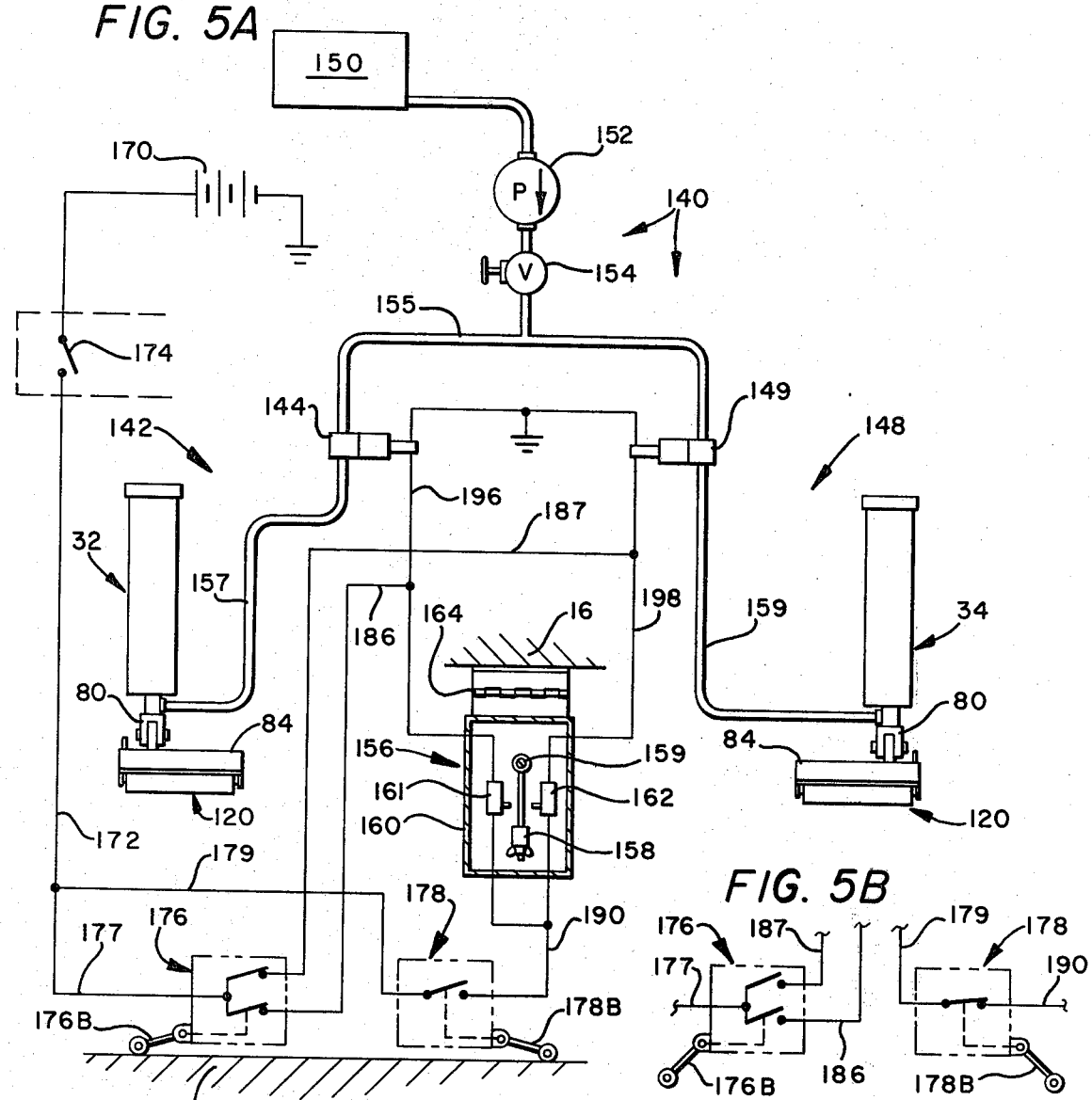
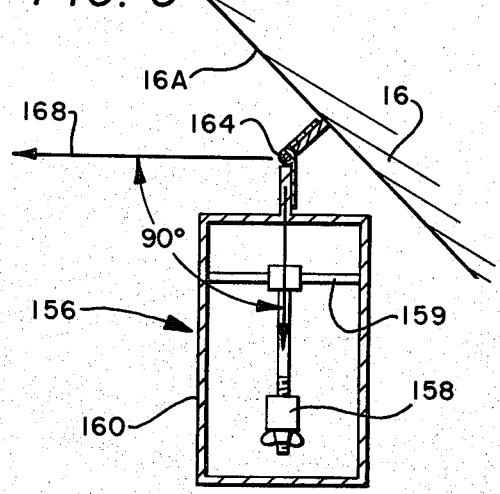

DUMPING VEHICLE STABILIZER SYSTEM

BACKGROUND OF THE INVENTION

This invention relates generally to stabilizer systems adapted to level the dump body of rear tipping dumping vehicles during unloading. More particularly, the present invention is concerned with stabilizer apparatus which levels the dumping body during unloading while permitting simultaneous manuevering of the tractor unit.

As will be appreciated by those skilled in the art, dumping vehicles comprise a cargo or load body structurally pivoted to the chassis frame of a trailer about an axis substantially parallel to one of the axles of the rear wheels. The dump body chassis may be resiliently supported on appropriate leaf springs associated with suitable shock absorbers. Usually the terrain upon which such vehicles are employed is uneven and rough. Hence, when the dump body is tilted to an unloading position, the trailer may become unstable. This factor is especially aggravated when very long dump bodies are employed on laterally sloping terrain. Since the center of gravity of the dumping body rises as the body is tilted upwardly, stability may decrease dangerously.

A plurality of prior art concepts have been proposed for stabilizing dump bodies during the unloading operation. One system incorporates the idea of locking the rear suspension of the trailer in a predetermined position during unloading. Examples of the latter concept are shown in U.S. Pat. Nos. 3,778,105; 2,999,721; 2,662,780. Hydraulic piston systems for leveling tilting bodies are shown generally in U.S. Pat. Nos. 3,044,832; 3,083,059; and 2,381,425. U.S. Pat. Nos. 2,829,901 and 3,362,299 disclose multi-piston systems wherein truck beds or the like are leveled by various control valves. U.S. Pat. No. 3,331,616 discloses a system wherein a vehicle (not a tilting unloading dumping vehicle) may be automatically leveled as it is loaded with increased weight.

In my prior U.S. Pat. No. 4,216,996 I have disclosed a system for leveling a trailer during unloading which employs a pair of rear mounted hydraulic rams independently controlled by a level sensing pendulum mechanism. Pressure plates are pivoted at the trailer rear and are forced into contact with the trailer wheels by independent hydraulic rams, the lowermost of which is actuated by the pendulum to compensate for level variances. The dump bed is elevated by a single ram extending from the tractor chassis to the underside of the tilt body. Although rear pressure plates stabilize the tilt body during dumping, forcible contact with the rear trailer wheels prevents movement. Therefore, during unloading the tractor may not be manuevered, since the rear wheels are "locked up". I have found that it is desirable to facilitate tractor manuevering during the unloading operation, while at the same time automatically leveling the trailer by a pendulum system which controls a pair of spacedapart tilt rams associated with the tractor. Moreover, by associating the pressure plates with the driven wheels of the tractor, rather than the wheels of the trailer, a number of benefits are achieved.

SUMMARY OF THE INVENTION

The present invention comprises an improved hydraulic stabilizer system for maintaining dump bodies level during an unloading operation over irregular or rough terrain.

The invention comprises a pair of elongated, telescoping hydraulic rams which may be pressured to tilt the dump body. The dump body is independently coupled to the conventional tractor fifth wheel assembly through appropriate linkage. The tilting rams are independently controlled by a hydraulic circuit which, in response to level sensing by a pendulum, independently actuates the lowermost of the drive rams whereby to constantly maintain the bed in a substantially level position.

Importantly, each of the rams extend between pressure plates associated with the tractor and the front of the dump body. The pressure plates are pivotally mounted at opposite sides of the tractor chassis over a driven wheeled axle. Thus the plate engages the wheels of the tractor during unloading, rather than the wheels of the trailer. Importantly, each of the pressure plates includes a plurality of rollers which engage the tractor wheels and permit rotation thereof. Hence the tractor and trailer may be manuevered during unloading. In other words, while the pressure plate and its associated rollers provide lifting support for the trailer rams, they permit the driven tractor wheels to rotate to manuever the apparatus over terrain as desired.

The pendulum sensing means is housed within a rigid enclosure independently pivotally coupled to the tractor dump body. In this manner, the pendulum housing is free to pivot during unloading in a plane generally parallel with the tractor trailer unit. The pendulum within the housing independently pivots in a plane substantially transverse with respect to the trailer body, whereby to sense tilting and hence level the body. Preferably the pressure plates are releasably, pivotally coupled to the tractor chassis by pins which may be removed from engagement by the operator after unloading. When the dump body is returned to the road position, the pressure plates are maintained out of engagement with the driven tractor wheels by a coupling system mounted upon the trailer which elevates the pressure plates vertically above the driven tractor wheels.

Thus, an object of the present invention is to provide a hydraulically actuated stabilizer system for dumping trailers.

More particularly, it is an object of the present invention to provide a stabilizing system of the character described which utilizes the main hydraulic ram systems for level control.

A still further object is to provide a dump body leveling system which, during unloading, will permit manuevering of the trailer unit by the tractor.

These and other objects and advantages of the present invention will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 1 is a side elevational view of a tractor trailer rig equipped with a dump body, and incorporating the stabilizer invention of the present invention, the dump body illustrated in a road position;

FIG. 2 is an enlarged, fragmentary perspective view of the stabilizer system, with the dump body illustrated in a dumping position;

FIG. 3 is an enlarged, exploded perspective view of the pressure plate assembly preferably employed in conjunction with the present stabilizer system;

FIg. 4 is an enlarged, elevational view of a portion of a driven wheeled rear axle of the tractor unit, illustrating the pressure plate in engagement upon the tires during the tilting operations;

FIG. 5A is a schematic and diagrammatic view of the hydraulic and electrical system employed in conjunction with the stabilizer system, the associated limit switches being illustrated in a road position.

FIG. 5B is an electrical diagram illustrating the limit switches in the dumping position; and, FIG. 6 is an enlarged sectional view of the pendulum housing assembly.

DETAILED DESCRIPTION OF THE DRAWINGS

With reference now to the drawings, the reference numeral 10 generally designates a tractor-trailer rig upon which the stabilizer system of the present invention has been installed. The tractor-trailer 10 includes a conventional tractor unit 12 which tows a dumping trailer 14 over terrain 13. Trailer 14 includes a dump body 16 supported at its rear by a pair of wheeled rear axles, generally designated by the reference numeral 18. Conventional driven, wheeled rear axles associated with tractor 12 are generally designated by the reference numeral 20. Each of the wheeled rear axles 18 or 20 include conventional wheels supporting conventional tires, the wheels being suitably secured to conventional hubs. For example, with reference to FIG. 4, wheeled rear axle 20 includes dual wheel systems 22 each supporting a conventional truck tires 24. The tractor chassis 26 supports a conventional fifth wheel assembly 28 coupled to the trailer dump body 16 by pivoting linkage means, generally designated by the reference numeral 30. As will be hereinafter described in detail, a pair of hydraulic telescoping rams 32, 34 emanating from tractor 12 are employed to tilt the dump body 16 when dumping is desired.

The dump body 16 is secured to the fifth wheel assembly 28 by trailer linkage, generally designated by the reference numeral 30. Linkage 30 includes first strut assembly 35 comprised of struts 36, 38 pivoted to mount 29 and terminating generally centrally beneath tractor bed 16 in a pivot rod 40 which extends between and is journaled through rigid side channel supports 42, 44. Suitable cross supports 50 are employed to brace struts 36, 38 together.

A second strut assembly, generally designated by the reference numeral 52, cooperates with assembly 35 to complete the trailer linkage 30. Assembly 52 comprises a pair of spaced-apart rigid channels 56, 58 which are pivotally coupled to strut members 36, 38 generally intermediate the length of members 36, 38. The latter pivot connection has been generally designated by the reference numeral 60. The lowermost portions of strut members 56, 58 are similarly pivoted (as designated by the reference numeral 62,) to frame structure 64 of the trailer 14. Cross braces 65 are employed to reinforce strut assembly 52. It will thus be apparent that as rams 32, 34 are pressured and the body 16 is thus tilted, the trailer linkage strut assemblies 35, 52 will pivot into the configuration most clearly depicted in FIG. 2 wherein dumping outwardly from the rear of trailer 16 is accomplished. It will also be apparent that the wheeled rear axles 18 of the trailer will be drawn towards the driven wheeled rear axles 20 of the tractor during dump body unloading.

As best viewed in FIG. 2, the uppermost portions of the hydraulic rams 32, 34 are secured at the front 15 of dump body 16. The booms are pivotally mounted with respect to front 15 between forwardly projecting braces 68, 70 by a collar assembly 72 which includes integral, outwardly extending pivots 74 on its opposite sides journaled through braces 68, 70.

As best viewed in FIGS. 2–4, the lowermost portions of each hydraulic ram 32, 34 terminate in a suitable, apertured, rigid clevis 80 which mounts the rams to the pressure plate assemblies generally designated by the reference numeral 82. The pressure plate assembly 82 includes a generally arcuate, rigid plate 84 from which a rigid, apertured tab 86 upwardly projects. Clevis 80 is pivotally coupled to tab 86 by a pin 88. A rigid mounting bar assembly, generally designated by the reference numeral 90, projects outwardly from the chassis 26 of the tractor 12. Mounting assembly 90 includes a generally rectangular, horizontally oriented brace 92 bolted to chassis 26, and reinforced with webs 93, 94. A pair of spaced-apart, upwardly projecting apertured tabs 98, 99 are secured to brace 92. As best viewed in FIG. 3, a similar pair of spaced-apart, apertured tabs 100, 102 project outwardly from the forward edge 85 of plate 84. The pressure plate assembly 82 is thus pivoted relative to chassis 26 when tabs 100, 102 are suitably aligned relative to tabs 98, 99, being held in place by a removable elongated pin 104. Pin 104 is axially thrust through the aligned orifices within tabs 98, 99, 100 and 102, terminating through aperture 106 defined in truck chassis 26.

Pressure plate 84 also includes a plurality of spaced-apart, apertured tabs 110 extending downwardly from the plate at its opposite sides 112, 114. A plurality of rollers, generally designated by the reference numeral 120, are rotatably mounted between opposite parallel tabs 110. Bearing structures 121 are journaled through the suitable apertures defined within tabs 110. Thus, as viewed in FIG. 4, when the pressure plate assembly 82 contacts the lower wheeled rear axle (in particular the tires 24) the rollers 120 support the weight transmitted by rams 32 or 34. However, since rollers 120 are rotatable relative to tires 24, tractor-trailer 10 may be manuevered relative to the unloading spot, as indicated generally by arrow 124.

As best viewed in FIGS. 3 and 4, a coupling 126 is secured to the outer edge 114 of pressure plate 84. Coupling 126 may be engaged by a conventional hook 128 supported by a line 130 for upwardly elevating plate 84 to the road position illustrated in FIGS. 1 and 4. As best viewed in FIG. 2, a pair of handle driven ratchet assemblies, generally designated by the reference numeral 132, are secured to the front 15 of dump body 16 adjacent to collars 72. These retractable units 132, which are conventional, may be activated by the truck driver, after lowering dump body 16 and removing pins 104, to elevate the pressure body assembly 82 to the out-of-the-way road position illustrated in FIG. 1.

With reference now to FIG. 5A, a primary electrical/hydraulic system for operating the apparatus of the present invention has been generally designated by the reference numeral 140. A first hydraulic sub-circuit, generally designated by the reference numeral 142, controls ram 32 through a first solenoid controlled valve 144 via line 157. A second hydraulic sub-circuit, generally designated by the reference numeral 148, controls ram 34 through a second solenoid valve 149, via line 159. Hydraulic fluid stored within a conventional reservoir 150 is pumped into the sub-circuits 142 or 148 through a conventional hydraulic pump 152 and a conventional control valve 154 via line 155. A pendulum assembly, generally designated by the reference numeral 156, includes a pendulum 158 disposed within a rigid pendulum housing 160. Pendulum 158 moves in response to gravitational forces in the direction of the lowermost side of the raised dump body. Pendulum 158 is pivoted at 159 for movements in a plane generally transverse with respect to the axis of the trailer 14. As best viewed in FIGS. 2 and 6, the pendulum housing 160 is pivotally mounted at 164 to the underside 16A of the dump body for pivotal displacement in a plane generally defined by the arrows 168. This plane is generally parallel with the axis of the tractor-trailer assembly 10.

Solenoid hydraulic control switches 144, 149 are actuated by the pendulum assembly 156. Conventional tractor battery 170 transmits power to a line 172 via a conventional switch 174. Line 172 makes power available to limit switches 176 and 178 via lines 177 and 179 respectively. As best viewed in FIG. 2, limit switch assemblies 176, 178 are mounted upon the bottom 180 of the tilt body support 182, which is secured to the underside 16A of tilt body 16. When the unit is deployed in the road position, the limit switch follower arms 176B, 178B will contact strut member 38 of the linkage assembly 30, previously described. Thus, when in the road position, solenoid valves 144, 149 will be controlled through limit switches 176 by main switch 174. At this time hydraulic fluid within the collapsed rams 32, 34 will be forced back into reservoir 150. Limit switch 178 will be open when the dump body is deployed in the road position, as illustrated in FIG. 5A.

However, when the dump body tilting is initiated by switch 174, limit switch 176 will immediately be opened, and switch 178 will be closed, in response to the withdrawal of followers 176B and 178B from contact with strut 38 (FIG. 5B). At this time power will be available to micro-switches 161, 162 (within pendulum housing 160) via electrical line 190. Thus if pendulum 158 tilts toward the left (as viewed in FIG. 5A) micro-switch 161 will be activated, whereby to energize solenoid valve 144 via line 196. Similarly, when pendulum 158 tilts toward the right, (as viewed in FIG. 5A) micro-switch 162 will energize line 198 to activate second solenoid valve 149. In this fashion tilting of the dump body during unloading in a plane transverse to the axis of the trailer will be compensated for by differential actuation of the drive rams 32 or 34.

Importantly, as this automatic leveling process continues the driver of the truck 12 may manuever the apparatus, since the pressure plate assemblies 82 permit rotation of the rear drive wheels, by virtue of the inclusion of rollers 120 previously discussed.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A stabilizer system for a rear dumping vehicle of the type including a trailer supported by at least one wheeled rear axle and a tractor unit for towing the trailer, the trailer including a dump body pivotally mounted about an axis parallel with one of its wheeled rear axle(s), the tractor unit including at least one driven wheeled rear axle assembly and a fifth wheel towing assembly associated with a rigid chassis, the system comprising:

linkage means coupling said trailer to said fifth wheel assembly;

first and second spaced-apart ram means for tilting said dump body, each of said ram means comprising telescoping, hydraulic cylinders attached at one end to the front of said dump body, and pivotally terminating at opposite ends in pressure plate means adapted to contact at least one of said driven, wheeled rear axle assemblies of said tractor during tilting of said dump body;

first hydraulic sub-circuit means for selectively actuating said first ram means;

second hydraulic sub-circuit means for selectively actuating said second ram means;

primary hydraulic circuit means for supplying hydraulic pressure to said first and second hydraulic sub-circuit means;

first solenoid valve means communicating with said primary hydraulic circuit means for actuating said first hydraulic sub-circuit means;

second solenoid valve means communicating with said primary hydraulic circuit means for actuating said second hydraulic sub-circuit means;

pendulum control means for leveling said dump body during tilting of said dump body by actuating that solenoid valve means activating the ram means on the lowest side of said chassis whereby to level the dump body as it is tilted; and, said pressure plate means comprising a plurality of spaced-apart, tire contacting rollers for permitting maneuvering of said tractor and thus said trailer when said dump body is being tilted.

2. The combination as defined in claim 1 wherein said pressure plate means is pivotally coupled to the tractor chassis.

3. The combination as defined in claim 1 wherein said pressure plate means is removably coupled to the tractor chassis to permit manual disengagement when said trailer dump body is lowered to a road position.

4. The combination as defined in claim 2 wherein said pressure plate means is removably coupled to the tractor chassis to permit manual disengagement when said trailer dump body is lowered to a road position.

5. The combination as defined in claim 4 wherein said pendulum control means is pivotally disposed within housing means, the housing means being pivotally secured to said dump body for pivotal movement fore and aft during tilting of said dump body.

6. The combination as defined in claim 5 including means secured to said dump body adapted to be coupled to said pressure plate means when said body is in a road position to lift and maintain said pressure plate means in an out-of-the-way position out of contact with said driven wheeled rear axle assembly.

* * * * *